United States Patent Office 3,427,882
Patented Feb. 18, 1969

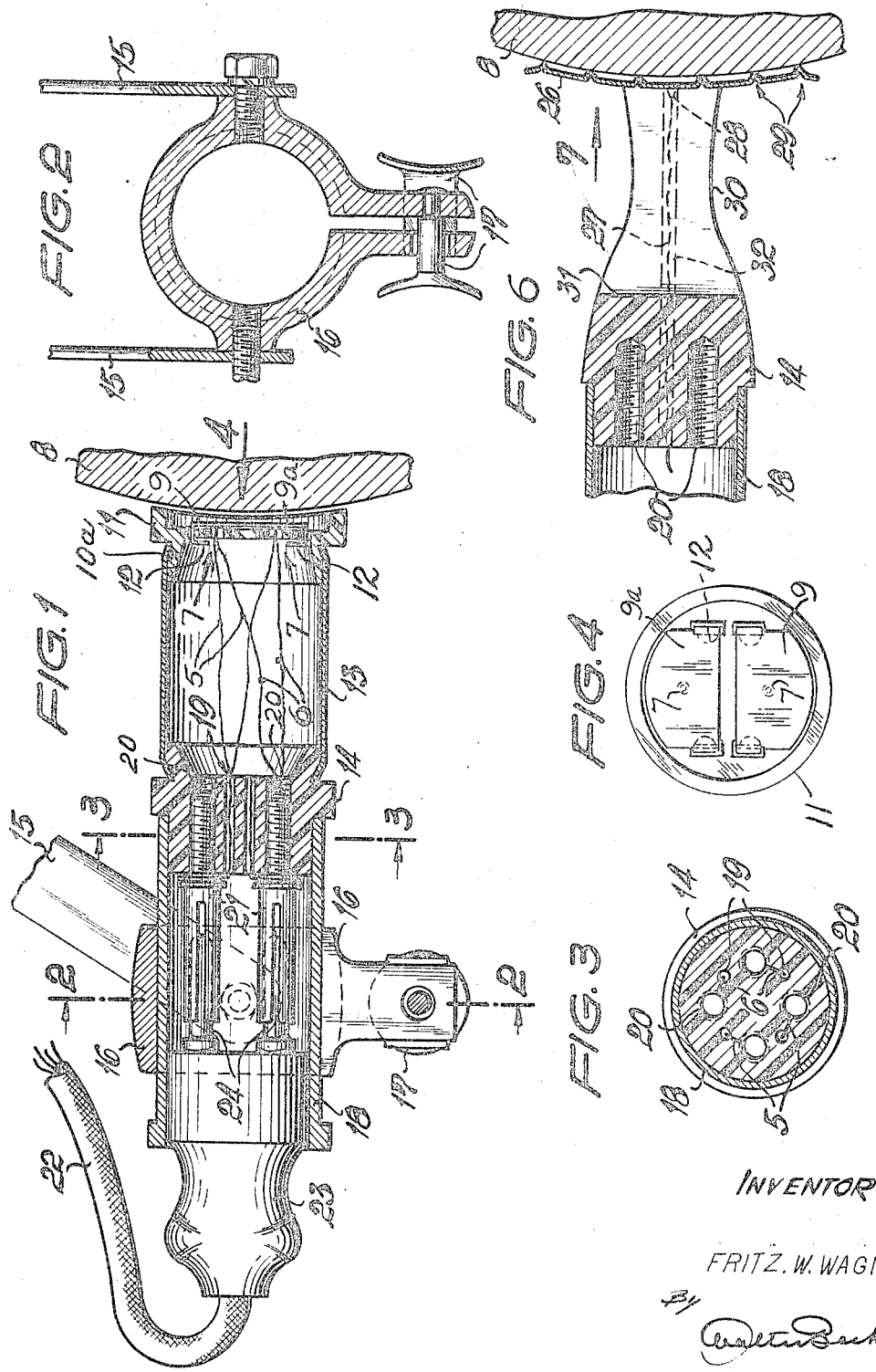

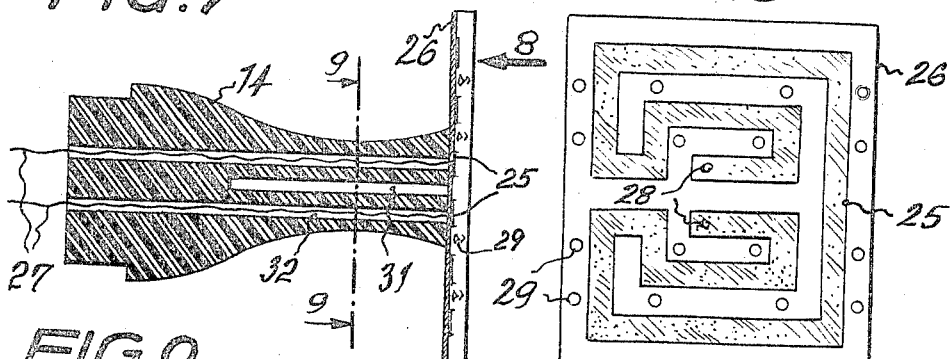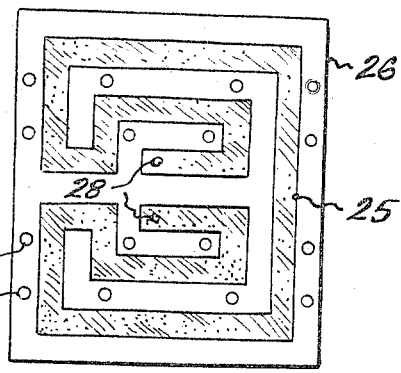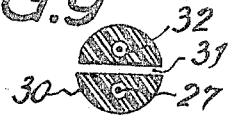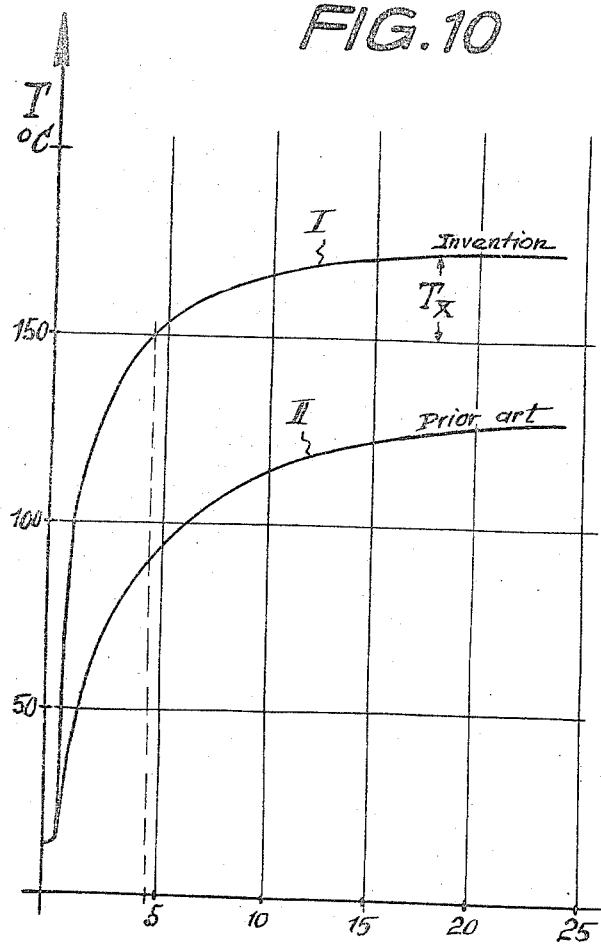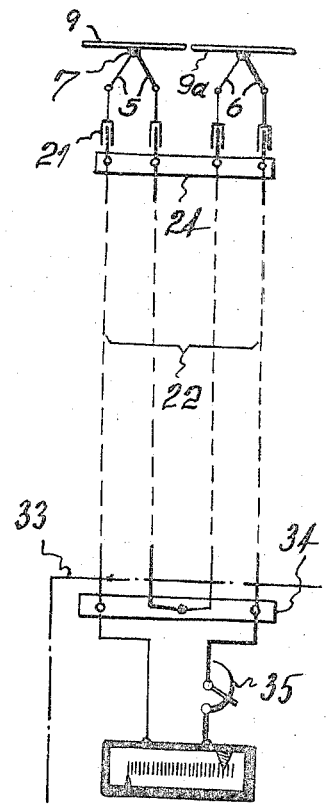

3,427,882
CONTACT-FREE TEMPERATURE-
SENSING DEVICE
Fritz W. Wagner, Krefeld, Germany, assignor to Joh.
Kleinewefers Sohne, Krefeld, Germany
Filed Apr. 4, 1966, Ser. No. 539,899
Claims priority, application Germany, Apr. 5, 1965,
K 55,725
U.S. Cl. 73—351      10 Claims
Int. Cl. G01k *1/12, 11/00, 7/04*

ABSTRACT OF THE DISCLOSURE

A temperature-sensing apparatus and supporting structure having a thermoelement, a temperature responsive resistor, or semi-conductor or the like as a thermal radiation sensor for contact-free temperature measuring of rotating objects. The apparatus includes the thermal radiation sensor arranged on a large surface heat conductive plate of small mass, and heat accumulating means of low heat conductivity arranged between said heat conductive plate and the support structure.

---

The present invention relates to a temperature-sensing apparatus for measuring temperatures in a contact-free manner. One of the most difficult problems in the measuring art is the contact-free measuring of the surface temperature of calender and roller mill rollers of steel or cast iron. In this connection, the possibility of measuring the temperature by means of thermo feelers in bores closely below the roller surface or the measuring by means of bi-metal elements is to be discarded in view of the various drawbacks inherent thereto.

If is desired to obtain constant and reproduceable values, the measurement of temperatures by means of temperature-sensing devices outside the roller is not possible by the measurement of radiation alone so that the effect of heat conduction of the border layer at the roller surface must be resorted to. Infra-red radiation, already within the range of the long wave radiation, shows a rather limited effect and cannot be measured by optical pyrometers because on one hand the temperature to be measured is far too low for this purpose, and on the other hand the color and the refraction ability of steel or cast rollers change continuously. The emissivity is also with dark tarnished rollers usually below 1 and varies greatly. Furthermore, the vapors and gases which rise unavoidably at the calender rollers considerably falsify infra-red measurements. Since, furthermore, the radiation varies with the fourth power of the absolute temperature, the values of the scale ends are extremely close to each other so that precisely in the measuring range, the reading precision is poor. Thus, as sole possibility for a useful contact-free temperature measurement, in addition to heat transfer of the air border layer, there remains only a small portion of the effect of the short wave radiation.

Contact-free temperature sensing devices with thermoelements or resistance producing means which operate with such mixed values of radiation and convection have become known. According to one embodiment of these known devices, the measuring element is located in the focus of a small mirror, whereas with another embodiment the measuring element is located in the feeler chamber which is whirled through by the border air layer. In view of the relatively large mass of the holding means for the temperature sensing element, these constructions have not proved suitable because in this way a considerable heat inertia is caused as a result of which the measuring voltage will time-wise greatly lag behind the actual value whereby the control which is already difficult in view of the required lead time fails entirely.

Also the heretofore known insulations in the vicinity of the temperature-sensing device increase the thermal inertia because they increase the mass in each instance. Moreover, the measuring voltage reaches only a portion of the rated value because no direct heat contact exists with the roller, so that standardized measuring mechanisms cannot be employed.

For purposes of avoiding the inertia, it has also become known to stretch out thin resistant wires or thermoelements close to the roller surface. However, also such arrangements have proved unsuitable in practice because of the expansion of the wire occurring with the time. Moreover, such wires are rather sensitive with regard to tearing due to soiling and corrosion.

It is, therefore, an object of the present invention to provide a temperature-sensing apparatus which will overcome the abovementioned drawbacks.

It is another object of this invention to provide a temperature-sensing apparatus which, while furnishing a mixed value of radiation and convection, will have a low thermal inertia while being extremely stable and which will furnish a more linearized curve of characteristics.

These and other objects and advantages of the invention will appear more clearly from the following specification in connection with the accompanying drawings, in which:

FIG. 1 is a longitudinal section through a temperature-sensing apparatus according to the invention in which a heat conductive sheet metal plate is by means of a thin-walled tube connected to a heat-accumulating body or poor heat conductor.

FIG. 2 is a section through the holding sleeve, said section being taken along the line 2—2 of FIG. 1.

FIG. 3 is a section through the heat-accumulating body, said section being taken along the line 3—3 of FIG. 1.

FIG. 4 represents an end view of the temperature-sensing apparatus of FIG. 1 as shown in the direction of the arrow 4 in FIG. 1.

FIG. 5 shows the wiring of a double thermocouple used in connection with the present invention.

FIGS. 6 and 7 respectively illustrate two different sections through a temperature-sensing apparatus of the invention according to which the carrier for a plate with a resistor strip is itself designed as heat-accumulating body.

FIG. 8 is a view of FIG. 7 as seen in the direction of the arrow 8 thereof and shows the back side of the plate carrying the resistor strip.

FIG. 9 represents a section taken along the line 9—9 of FIG. 7.

FIG. 10 illustrates the time curves of a temperature-sensing apparatus pertaining to the prior art and a feeler according to the present invention.

The objects of the present invention have been realized according to the present invention by an arrangement according to which the temperature-sensing element for instance in the form of a thermoelement, resistor, semi-conductor or the like, is mounted on a heat-conductive plate of a minimum mass, which plate is well adapted to absorb radiation, said temperature-sensing element being connected to supporting means low in mass, through the intervention of a heat-accumulating body or poor heat conductor. In this connection, a resistor may be connected for instance by metal-vaporizing directly to the heat-conductive plate while a non-conductive layer is interposed between said plate and the resistor.

For purposes of realizing a small mass, the heat conductive plate which absorbs radiation and convection heat of the border air layer may consist of a thin silver foil having a thickness of approximately 0.1 to 0.5 millimeter or may consist of an insulating material as, for instance, mica plates or the like. The temperature sensor is so designed that in the holding means therefor it can be easily displaced relative to the roller for effecting a fine adjustment while the holding means with the sliding sleeve and the terminals are separated from the front temperature sensing element by the mentioned heat-accumulating portion, and therefore cannot affect the temperature sensing element by heat off-flow or heat in-flow.

A further important feature of the invention consists in that two serially arranged thermoelements with separate temperature-sensing elements are employed because due to the contact-free measurement, one thermo-element alone can never furnish the full rated voltage. The measuring voltage thus doubled will then in each instance be above the rated value, and therefore, in order to be able to employ standardized measuring instruments, the excess in measuring voltage can be reduced by a resistor or by a resistance measurement by means of a bridge.

Referring now to the drawings in detail and FIGS. 1 to 4 thereof in particular, the sensing device shown therein comprises two thermoelements 7, connected by leads 5 and 6 (FIG. 3) which, for purposes of a good absorption of the heat radiation and of the temperature of the border air layer of the roller 8 to be checked, are welded to two thin silver foils 9 (FIG. 4) which act as heat-conductive foils. In order to protect the roller surface the temperature of which is to be measured, the silver foils are connected to a thin-walled pot-shaped support 10 of a heat-resistant synthetic material as for instance a fluorized tetrapolyethylene. This connection is advantageously effected by means of ears 12 extending through said carrier or support 10, but may also be effected by cementing or the like. In view of the somewhat protruding protective collar 11, a chamber of low height is created in which the border air layer, i.e. the air layer adjacent to the periphery of the roller, the temperature of which is to be measured, will be taken along by the rotating roller and will convey its temperature to the silver foils 9.

The carrier or support 10 has at its back an annular flanged portion 10a which through a thin-walled pipe 13 is connected to a heat-accumulating body 14 which represents a poor heat conductor acting as a heat barrier. Body 14 in its turn is connected to the holding means of the temperature-sensing apparatus. In the particular embodiment shown in the drawing, the holding means comprise adjustable tiltable levers 15 (FIG. 2) with a clamping sleeve 16 in which is displaceably arranged a slidable pipe 18 the front end of which is closed by said heat-accumulating body 14. By loosening screws or by exerting pressure upon a scissor-like arrangement 17 on the clamping sleeve 16, the tension of the latter is reduced so that the pipe 18 with the carrier or support 10 can be adjusted up to 1 millimeter distance from the roller, the temperature of which is to be measured. The heat-accumulating body 14 may consist of a fluorized tetrapolyethylene or of asbestos-cement. The heat storage body 14 has bores 19 for the passage of the measuring element conductors 5 and 6, and is furthermore provided with threaded bores 20 for receiving four correspondingly threaded contacts or sockets 21, when the connection of the measuring conductor means 22 with the temperature-sensing apparatus is to be effected by a plug 23 with the pins 24. In the last mentioned instance, however, it is necessary in order to avoid faulty voltages, to employ rhodinized contacts.

According to a further feature of the present invention, with thermo voltage measurements, the series arrangement of the two thermoelements 5 and 6 as shown in FIG. 5 is effected only in the control cabinet, so that the measuring conductor means consists of four balancing conductors. In this way, a thermostat for maintaining the temperature constant at the cold junctions will in most instances not be necessary.

FIGS. 6 to 9 show another embodiment of the present invention. According to this embodiment, the temperature-sensing element, in this instance, measuring resistor 25, is mounted on a large surface heat conductive plate 26 and is connected through conductors 27 with the plug. The heat-conductive foil or plate 26 may consist of a thin silver foil or, alternatively a plate may be used which consists of a heat resistant insulating material such as a mica disc. The measuring resistance is arranged on the front or the back side of said heat-conductive plate and at the soldering points 28 is connected to the conductors 27.

In conformity with a further development of the present invention, such a measuring resistor 25 is in the form of a serpentine-shaped strip steamed upon the heat-conductive plate 26. When a metallic heat-conductive plate is employed, an insulating layer is interposed, whereas when a mica plate is employed, the measuring resistance strip may be directly mounted thereon.

For purposes of assuring a good heat transfer from the border air layer to the heat conductive plate, it is suggested in conformity with the present invention to provide said heat-conductive plate with circulation slots or with outwardly extending protrusions 29 by means of which a good turbulence of the border air layer will be effected between the heat-conductive plate and the roller the temperature of which is to be measured.

The connection of the heat-conducting plate to the heat-accumulating body 14 is so effected that said body 14, for reducing the mass has a greatly reduced portion 30 the outer end of which has directly connected thereto the heat-conductive plate by means of screws or by cementing. The reduced portion 30 is furthermore provided with a slot 31 for reducing the mass, and furthermore comprises bores 32 for passing the conductors 27 therethrough.

The remaining design and connection of the temperature-sensing device may be effected in any convenient manner. In this connection, it is important that the front portion of the temperature-sensing element proper and the carrier therefor with the spacer members 13 and the cross section-wise reduced portion 30 has a minimum of mass and is spaced from the device and the holding means therefor by a heat-insulating accumulating portion or distance. In this way, the temperature-sensing device will reach its maximum temperature faster than the temperature which occurs during the heating up or cooling off of the roller. In other words, the temperature feeler according to the invention will with regard to the heating up of the roller work in an inertia-free manner. Also the linearity of the temperature curve of the temperature-sensing device and the speed at which it heats up will be improved. Thus, FIG. 10 shows the temperature curve I of a temperature-sensing device according to the invention and also shows a curve II of a temperature-sensing device of the same type of the prior art. For the two devices the characteristics of which have been shown in FIG. 10, it is assumed that they have been arranged adjacent to a steel roller which has been heated up already to 150° C. constant temperature. As will be seen from FIG. 10, the temeprature-sensing device according to the present invention reaches 150° C. after four and one-half minutes, and after sixteen minutes has reached its constant maximum value which in view of the series arrangement of two thermoelements has reached a temperature exceeding the rated value by $T_x$. The excessive value $T_x$ is reduced by an equalling resistor 35 (FIG. 5). With a temperature-sensing device of the prior art, on the other hand, the temperature increase in conformity with curve II is effected at a considerably lower rate and the stationary condition is obtained only after two hours.

It is, of course, to be understood that the present invention is, by no means, limited to the particular arrangements shown in the drawings but also comprises any modifications within the scope of the appended claims.

What I claim is:

1. A temperature-sensing device for measuring in a contact-free manner the temperature of rotating bodies, especially calenders for textiles, paper and synthetic materials, and rollers and roller mills, which includes: temperature-sensing plate means of a relatively large surface and small mass for mounting near a surface the temperature of which is to be measured, thermoelements connected to said plate means, supporting means supporting said thermoelements and including means of a poor heat conductivity to form heat barrier means for preventing any material flow of heat from and to said plate means through said supporting means, and an electrically insulating layer between said thermoelements and said plate means.

2. A temperature-sensing device for measuring in a contact-free manner the temperature of rotating bodies, especially calenders for textiles, paper and synthetic materials, and rollers and roller mills, which includes: temperature-sensing plate means of a relatively large surface and small mass for mounting near a surface the temperature of which is to be measured, thermoelements connected to said plate means, supporting means including a cylindrical body and supporting said thermoelements and said plate means and also including means of a poor heat conductivity to form heat barrier means for preventing any material flow of heat from and to said plate means through said supporting means, and holding means adjustably supporting said device for adjusting said plate means relative to the surface the temperature of which is to be measured, said holding means including a clamping sleeve slidably and adjustably supporting said cylindrical body, said means of poor heat conductivity being arranged between said plate means and said holding means.

3. A device according to claim 2, which includes tubular spacer means of small mass interconnecting said plate means and said means of poor heat conductivity.

4. A device according to claim 2, in which said plate means includes a metallic part of high heat conductivity and also includes a part of high heat resistant material.

5. A device according to claim 4, in which said part of high heat resistant material consists of mica.

6. A device according to claim 2, in which said thermoelements are metal-vaporized onto said plate means.

7. A device according to claim 2, which includes two thermoelements arranged in series and also includes resistor means electrically connected to said thermoelements for reducing excess voltage.

8. A device according to claim 7, in which the series arrangement of said two thermoelements is effected only in the measuring box.

9. A device according to claim 2, which includes a four-pole plug with rhodinized contacts for connection of said thermoelements to measuring conductor means.

10. A temperature-sensing device for measuring in a contact-free manner the temperature of rotating bodies, especially calenders for textiles, paper and synthetic materials, and rollers and roller mills, which includes: temperature-sensing plate means of a relatively large surface and small mass for mounting near a surface the temperature of which is to be measured, thermoelements connected to said plate means, and supporting means including a cylindrical body and supporting said thermoelements and said plate means and also including means of a poor heat conductivity to form heat barrier means for preventing any material flow of heat from and to said plate means through said supporting means, that face of said plate means which is to face the surface the temperature of which is to be measured being provided with slight elevations spaced from each other.

References Cited
UNITED STATES PATENTS

| | | | |
|---|---|---|---|
| 2,414,792 | 1/1947 | Becker | 338—18 |
| 2,516,873 | 8/1950 | Havens et al. | 338—18 |
| 2,627,182 | 2/1953 | Quereau et al. | 73—351 |
| 2,635,468 | 4/1953 | Field et al. | 73—355 |
| 2,921,972 | 1/1960 | Kreisler et al. | 73—190 |
| 2,938,122 | 5/1960 | Cole | 73—355 XR |
| 3,075,386 | 1/1963 | Daly | 73—355 |
| 3,282,107 | 11/1966 | Ekstrom | 136—213 XR |
| 3,295,842 | 1/1967 | Stelling et al. | 73—351 XR |

LOUIS R. PRINCE, *Primary Examiner.*

FREDERICK SHOON, *Assistant Examiner.*

U.S. Cl. X.R.

73—355; 136—213